United States Patent [19]

Elwood

[11] Patent Number: 4,656,908
[45] Date of Patent: Apr. 14, 1987

[54] APPARATUS AND METHOD FOR CONTINUOUSLY CUTTING SHREDDED GRAIN PRODUCT

[75] Inventor: Clifford C. Elwood, Niagara Falls, Canada

[73] Assignee: Nabisco Brands, Inc., Parsippany, N.J.

[21] Appl. No.: 665,257

[22] Filed: Oct. 26, 1984

[51] Int. Cl.⁴ ............................................. A21C 11/00
[52] U.S. Cl. ....................................... 83/863; 83/887; 99/450.2; 241/235
[58] Field of Search ...................... 241/101.4, 236, 235; 99/450.2, 537; 83/862, 863, 864, 865, 886, 887, 114, 132, 155, 682; 426/503, 518

[56] References Cited

U.S. PATENT DOCUMENTS

| | | |
|---|---|---|
| 807,420 | 12/1905 | Copland . |
| 931,243 | 8/1909 | Williams . |
| 991,584 | 5/1911 | Williams . |
| 2,887,964 | 5/1959 | Griner . |
| 3,024,112 | 3/1962 | Burgess . |
| 3,054,677 | 9/1962 | Graham, Jr. et al. . |
| 3,225,718 | 12/1965 | Page . |
| 3,880,030 | 4/1975 | Rosengren . |
| 4,004,035 | 1/1977 | Hirzel et al. . |
| 4,075,359 | 2/1978 | Thulin . |
| 4,276,800 | 7/1981 | Koppa et al. . |

*Primary Examiner*—Mark Rosenbaum
*Attorney, Agent, or Firm*—Richard Kornutik

[57] ABSTRACT

A rotary cutter assembly and means for cutting and scoring a continuous web of shredded grain product which includes in combination slitting means which receives the web from a conveyor, cuts the web in the linear direction, and transfers the web in the machine direction. The assembly also includes a driven cutter wheel arranged separately from the slitting means which receives the continuous web after it has been slit, cuts, crimps and scores the web in the transverse direction at selected intervals. An endless transfer belt is mounted on the cutter wheel and is driven by the wheel whereby the web is transferred in the machine direction.

1 Claim, 4 Drawing Figures

APPARATUS AND METHOD FOR CONTINUOUSLY CUTTING SHREDDED GRAIN PRODUCT

BACKGROUND OF THE INVENTION

The present invention relates to the art of preparing shredded grain product, and, in particular, concerns improved apparatus and method of cutting and scoring shredded grain product in the plastic or pulpy state.

Devices for making shredded cereal products are well known. In the conventional process a grain, such as wheat or a combination of wheat and other grain is first softened by cooking and tempering, and is fed into each of a series of shredding mills. The conventional shredding mill comprises a pair of closely spaced rolls that rotate in opposite directions, with at least one of the rolls having circumferential grooves. Upon passing between the rolls, the wheat is deformed into long individual strings or shreds. In some procedures, the rolls have cross grooves as well as circumferential grooves in order to achieve a web effect rather than merely a single strand.

The shredding mills are arranged in a linear series across a common conveyor, with the shreds running longitudinally or in parallel with the direction of movement of the conveyor.

Having obtained the requisite web thickness, the multiple layer web can be cut and scored to provide a continuous line of biscuits having edges which are partially cut and crimped whereby, upon baking, the grain product is sealed along the crimped edges to form individual shredded grain pieces. Thus, the cutting operation serves to provide separation of the individual pieces and to seal the severed edges.

For example, U.S. Pat. No. 4,004,035 to Hirzel, et al. discloses a method for formation of a shredded food article in the form of a biscuit by depositing a web of longitudinally shredded food transversely across a moving bed in a uniform overlapping zig-zag configuration whereby a wider, continuous, multiple layer sheet is formed. The sheet is then cut longitudinally following by transversely cutting the sheet to produce a plurality of files and rows of lapped shredded biscuits on a moving bed.

Another method of making a shredded cereal product includes formation of a cereal dough which is kneaded, worked and cooked while passing through an extruder-heat exchanger preferably through a die having a circular arrangement of closely adjacent orifices thereby discharging a cylindrical arrangement of dough strands. See U.S. Pat. No. 3,054,677 to Graham, et al. See also U.S. Pat. Nos. 991,584 and 931,243 to Williams which disclose use of circular cups or baking forms wherein shredded grain product is deposited for baking.

A major disadvantage of conventional systems is the extensive outlay in capital equipment required for a single biscuit line. Large scale production requires a number of separate lines, each with its own series of shredding mills, conveyor, cutting and handling devices.

Another drawback with the conventional process is the inherent limitation on possible biscuit sizes, especially since shredding rolls have a fixed width and are capable of producing a shred layer of only a single width. Although the shredded web may be subdivided longitudinally as well as being cut transversely, possible piece size variations are substantially limited. A major change in biscuit size might very well require a costly replacement of shredding mills.

In the case of cutting the web by press type cutters or rotating contact cutters in which individual blades contact the web at regular intervals, continuous production is hampered by limited tensile strength and stickiness of the shredded material which causes the material to adhere to the blade or prevents the blade from properly severing the material. Moreover, air blow-off systems are required to effect separation of the web from the cutter which are energy consuming and which cause breakage of the product. Thus, although a range of products can be successfully shredded in shredding mills, only those products possessing rather specific properties in shredded form can be successfully shaped by conventional procedures.

It is, therefore, an object of the present invention to provide a smooth running rotary cutter assembly which will cut a continuous web of multi-layered shredded grain product without the problems normally associated with cutting a web of shredded grain product.

SUMMARY OF THE INVENTION

The present invention is a rotary cutter assembly for cutting and scoring a continuous web of shredded grain product including, in combination, a slitting means which receives said continuous web, cuts said continuous web in the linear direction, and transfers said web further along in the machine direction. The rotary cutter assembly also includes a driven cutter wheel arranged separately from the slitting means which receives the continuous web, cuts, crimps, and scores the web in the transverse direction at selected intervals, and which includes an endless transfer belt mounted on the cutter wheel and is driven by the wheel so that the web is transferred in the machine direction.

In one embodiment, the slitting means includes a driven roll having at least one circumferential knife edge, and can have as many as about six such knife edges, over which the continuous web passes whereby it is continuously slit and crimped in the linear direction. Preferably, the knife edge is not less than about 1/64" and not more than about ⅛" wide, and most preferably, the knife edge is not less than about 1/32" and not more than about 1/16" wide.

In one preferred embodiment of the invention, the circumferential knife edges can be removable discs mounted on a drive shaft. This configuration provides the user with the capability of maintaining a narrow knife edge, as well as being able to vary the width of the linear cut by the use of spacing elements.

Product retention in the slitting means can be prevented by providing stationary fingers above the product and between the slitting discs whereby the slit web is kept from lifting up into the slitter. A preferred method for preventing product retention in the slitter includes an endless belt mounted on spacing elements and around an idler wheel adjacent the slitting means. The belt, which can be driven by the slitter, allows uninterrupted slitting in the absence of product retention.

The embodiment described above also includes a smooth roll adjacent the driven roll fixed at a distance from the driven roll whereby the knife edge bears against the circumferential surface of the smooth roll during operation of the assembly, so that the continuous web is cut and crimped between the bearing surfaces of the two rolls.

One preferred embodiment of the invention also includes a cutter wheel which has cutter blades fixed on the circumferential surface thereof substantially parallel to the axis of the cutter wheel at selected intervals and an opposing wheel fixed adjacent the driven cutting wheel for bearing contact with the cutter blades during operation of the cutting wheel. Furthermore, an idler wheel can be provided at a position relative to the cutter wheel whereby a transfer belt can be mounted thereon to extend in the machine direction of the assembly during operation.

The transfer belt is preferably an endless support wider than the length of the cutting blades and having cutting blade openings extending transversely of the belt at distances from each other corresponding to at least the distances between the cutter blades whereby each of the cutter blades protrudes through the openings as the belt travels around the cutter wheel. In the most preferred embodiment, the rotary cutter blades are replaceable on the cutter wheel.

Just as in the case of the slitter blades, the cutter blade edge is preferably not less than about 1/64" and not more than about ⅛" wide, and most preferably, not less than about 1/32" and not more than about 1/16" wide.

Another embodiment of the invention includes an opposing wheel which can have a smooth surface or which can have transverse cutting edges spaced on the circumference of the wheel at distances which correspond to the distances between the cutting blades on the cutter wheel whereby the cutting edges bear against the cutting blades when the assembly is in operation to cut and score the shredded grain web. In this embodiment, product molding cups are preferably formed between the cutting edges, each of the cups having an overall surface with a cross section which is the meeting of three different sized arcs. A first arc surface which forms the deepest part of the cup is met on the upstream side by a second arc surface formed from a circle of less circumference than the first arc, and the first arc surface is met on the downstream side by a third arc surface formed from a circle of less circumference than the second arc. The third arc surface meets the second arc surface at each of the cutting edges. This embodiment can also include an endless belt mounted on the opposing wheel and an idler wheel adjacent thereto whereby uninterrupted product molding is effected in the absence of product retention on the opposing wheel.

Finally, the present invention also includes a method of cutting and scoring a continuous web of shredded web product including simultaneously longitudinally slitting and transferring the continuous web of shredded grain product separately from transversely cutting/scoring the web at selected intervals by a driven rotary cutter on which an endless transfer belt is mounted for simultaneously transferring the web in the machine direction.

As a result of the present invention, a shredded grain product can be produced having less density and a better crimp on the edges. Furthermore, as a result of the ability to use transfer belts for the continuous conveyance of the shredded web in the machine direction, trouble-prone panner and cutter chain operation can be eliminted.

Other advantages realized by use of the present system is that the transfer belt provides a very smooth travel from the cutter wheel with no damage of product which normally results by blowing of excess air. The product can be cut with no hangup in the cutting cup or doubling over of the product. As a result of these and other advantages, smaller piece sizes can easily be accommodated.

As a result of eliminating the need for an air blow-off system, noise pollution is reduced while a definite cost savings is realized. Furthermore, when using the normal blow-off system, it is necessary to crimp the shredded web in the lateral direction at staggered intervals so that when the web is blown off the wheel by the air shoe, it is not severed by the pressure of the air along a single line of crimp going laterally from side to side on the web. However, such staggered crimping causes a high degree of breakage when the product is separated after baking, because the corners are broken when the staggered squares are broken away from each other. Needless to say, as a result of the present invention which allows a single transverse crimp by elimination of the need for an air shoe, this excess breakage has been eliminated.

An additional advantage realized by the present invention is the ability to change the size of the shredded grain product by merely changing the blades on either the slitting means or the distance between the replaceable blades on the cutter wheel, and opposing wheel, if applicable, not to mention the ability to keep the size of the crimp relatively small at all times by replacing the transverse cutting blades and knife edges as needed. Moreover, since the cutter wheels are interchangeable in a frame, the product line can be changed to any type of product merely by selecting the appropriate cutter wheel and slitting means.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Preferred embodiments of the invention have been chosen for the purposes of illustration and description and are shown in the accompanying drawings, wherein.

DETAILED DESCRIPTION OF THE INVENTION

Figure 1:
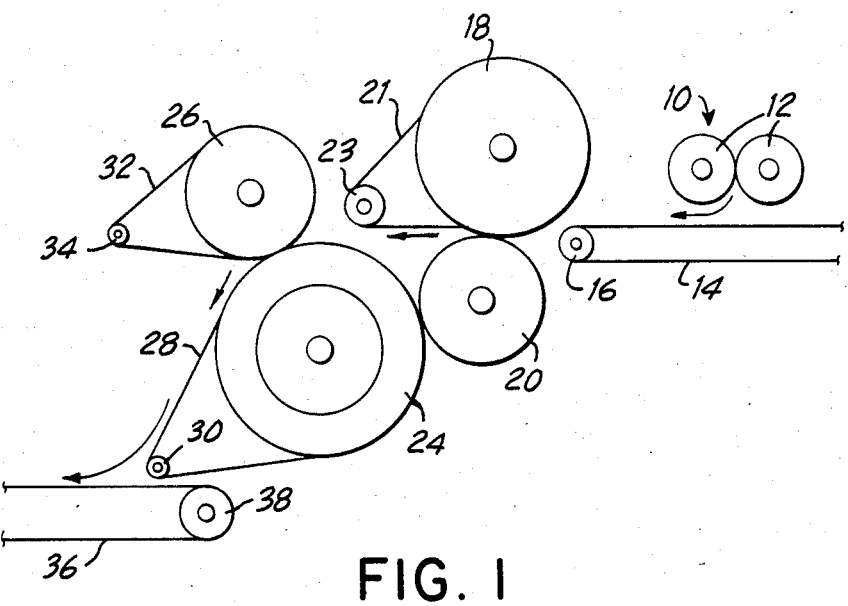
FIG. 1 is a schematic representation of a preferred embodiment of the invention.
Figure 2:
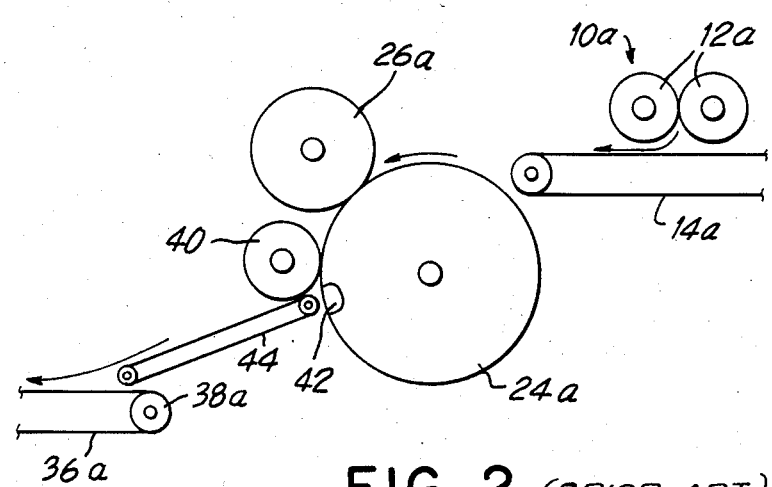
FIG. 2 is a schematic representation of apparatus known in the art.

Referring to FIGS. 1 and 2, there is shown a shredding station 10 which includes a pair of closely spaced rolls 12 of a given or fixed width. Preferably, one of the rolls has a smooth circumference and the other roll has a grooved circumference, as is well known in the art. The rolls are rotated toward one another, and the cooked food is passed therebetween causing the food to be elongated into a plurality of individual strands or shreds. Usually a plurality of shredding mills are disposed across a common moving endless conveyor 14 which serves to transport a multiple layer or web of shreds away from the mills and to a cutting device such as the apparatus of the present invention. The shredding mills are oriented such that the shreds are uniformly deposited and carried along the conveyor 14 with the shreds running longitudinally or in parallel with the direction of movement of the conveyor. Other known shredding devices may also be employed.

In the preferred embodiment, the food to be shredded includes whole wheat that has been softened by cooking and tempering. Other foods or food mixtures which are capable of being shredded may also be employed, either with or without wheat, including other cooked cereal, such as corn, oats, barley or bran, wheatgerm, defatted soy, other vegetable protein, fruits, vegetable slurries and mixtures thereof, together with suitable vitamins, minerals, flavors and preservatives.

The moving conveyor is preferably in the form of a wide, imperforate endless belt disposed around rolls 16, one of which at least is driven to move the belt in the direction toward the cutter so that the layered shredded product moves toward the cutter as shown in the figure by the arrow originating from the shredding rolls 12.

Figure 3:
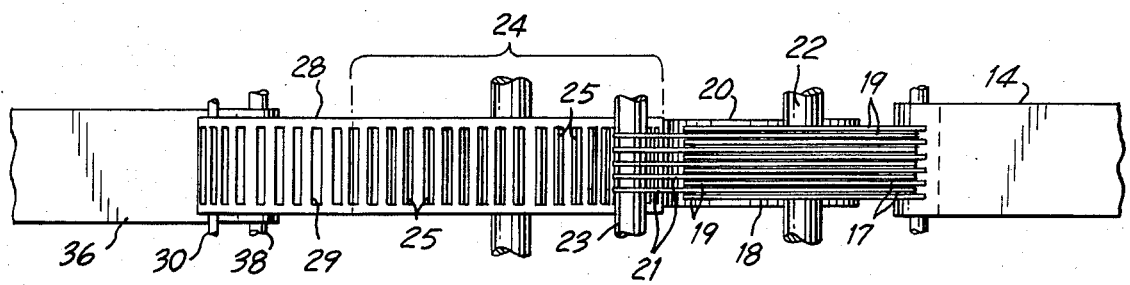
FIG. 3 is a plan view of one embodiment of the invention.

The continuous web of shredded product is introduced to the combined cutting assembly of the present invention by feeding the web to trimmer/slitter roll 18 which bears against adjacent smooth roll 20 whereby the multi-layered web is crimped and cut in the linear direction. Referring to FIG. 3, it can be seen that slitter roll 18 can be made up of several knife edges 19 shown in the figure as having six each which are mounted on a driven axle 22. The knife edges can have a width of not less than about 1/64" and not more than about ⅛", and is preferably between not less than about 1/3241 and not more than about 1/16". In order to keep a knife edge at the optimum slitting width, such edges are preferably discs which can be removed and replaced by the operator. A further advantage is gained by having the capability of spacing the knife edges at various distances from each other using spacer elements 17. As a result of this feature, different products can conveniently be prepared using the same production lines, but with different distances between the knife edges.

In order to prevent retention of the continuous web product in slitter 18 an endless belt 21 can be provided which is mounted around and driven by driven slitter 18, and which can be extended in the machine direction around idler roll 23. When spacer elements 17 are used in combination with knife edges 19, the endless belt 21 is in the form of a series of narrow belts which extend around idler wheel 23. (See FIG. 3).

Having crimped and slitted the web in the linear direction by use of slitter 18, the web is then introduced to cutter wheel 24 which is shown in the drawings as bearing against opposing cutter roll 26. The present invention also includes a transfer belt 28 which is mounted on the cutter wheel 24 and is extended to an idler wheel 30 downstream of the apparatus. Referring to FIG. 3, the transfer belt 28 is shown from the top side thereof so that cutter teeth openings 29 can be seen. These openings are spaced from one another a distance such that the cutter teeth on the cutter wheel extend up through the openings as the transfer belt goes around the cutter wheel 24. The openings extend in the transverse direction a distance sufficient to allow the cutter teeth to protrude therethrough and are bordered on either side by an extension of the transfer belt 28. Thus, in operation, the cutter wheel also acts as a sprocket which drives the transfer belt to convey the web in the machine direction.

In a preferred embodiment of the invention, the cutter blades 25 bear against the opposing roll 24 which can be smooth, or in one preferred embodiment of the invention, have cutter teeth 27, so that as the web of shredded product passes therebetween, the cutter blades crimp and cut the web in the lateral direction.

Figure 4:
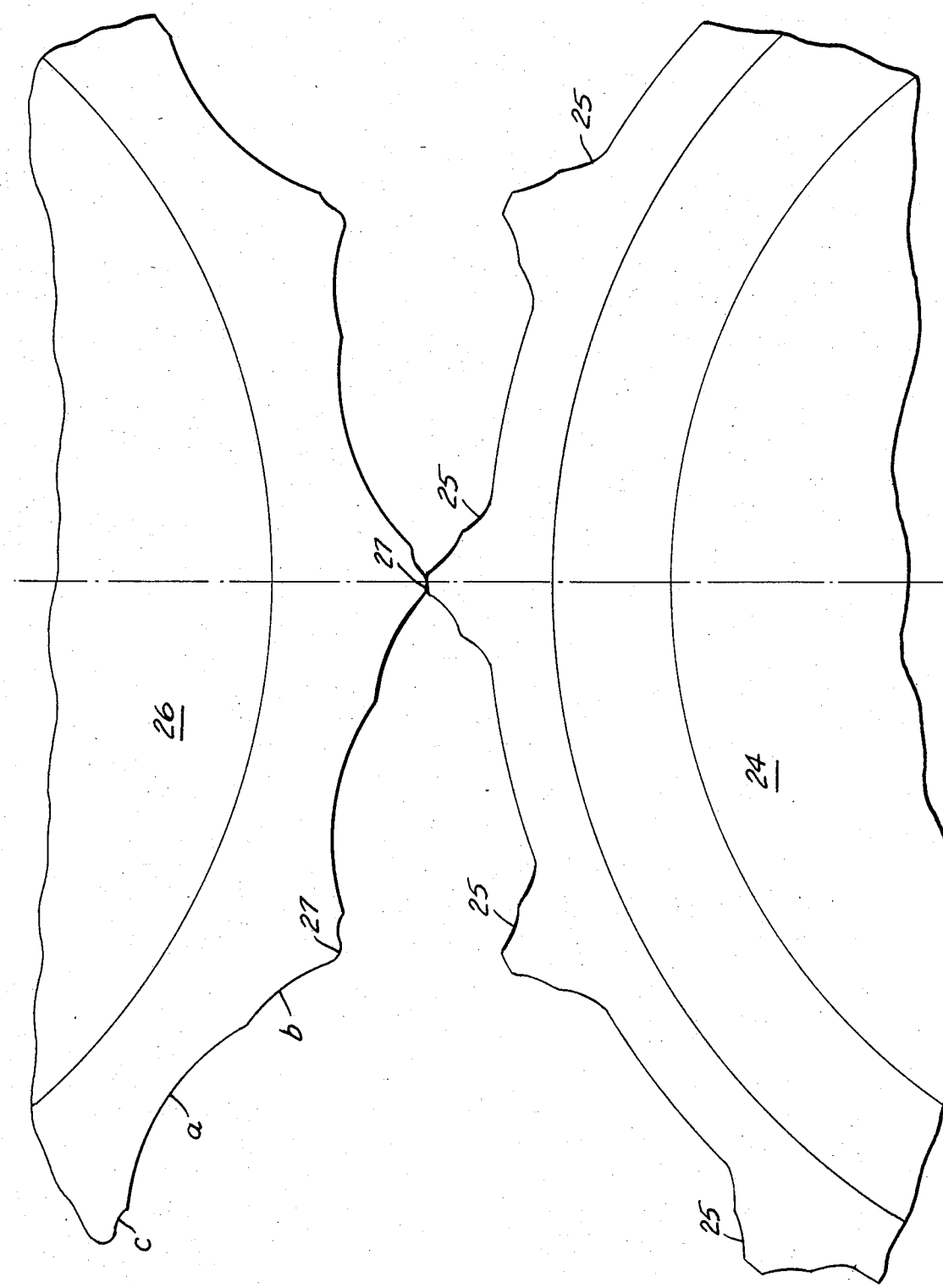
FIG. 4 is an elevated side section of the embodiment of the invention in which the cutter wheel is used in combination with an opposing roller having cutter edges.

When the opposing wheel 26 has transverse cutting edges spaced on the circumference thereof at a distance corresponding to the distances between the cutting blades on the cutter wheel, it is preferable that molding cups be formed between the cutting edges. Each of the molding cups preferably have an overall surface with a cross section which is the meeting of three different sized arcs. Referring to FIG. 4, it can be seen that the first arc "a" forms the deepest part of the cup and is met on the upstream side by a second arc surface "b" formed from a circle having a circumference which is less than the circumference of the first arc "a", while the first arc "a" is also intercepted on the downstream side by a third arc surface "c" formed from a circle having a smaller circumference than the second arc "b". The third arc surface "c" meets the second arc surface "b" at each of said cutting edges. As a result of this configuration, the shreds on either side of the edge are pressed together before cutting which prevents the breaking of shreds and avoids brushing action on the leading edge of the biscuit.

In this embodiment, another preferred mode includes the use of a cutter belt 32 mounted on the opposing roll 26 and over an idle roll 34 to preclude deposition of the shredded product in the cup area between the cutting edges on the roll 26. In operation, the cutting blades, which can be removed and replaced on the cutter wheel, receives the web of product from the slitter and continually transfers the web in the machine direction so that as it passes between the cutter wheel and the opposing roll 26, the product is transversely crimped and cut in the transverse direction. The transfer belt 28 conveys the slit and transversely cut product onto receiving conveyor 36 which continues its progress in the machine direction towards further processing elements such as baking ovens.

Referring to FIG. 2, there is shown an apparatus and method known in the prior art for cutting continuous web of shredded product. Accordingly, each of the elements of the process are designated as closely as possible to a corresponding element in the process of the apparatus of the invention. Specifically, the shredder station 10a having shredder rolls 12a, continuously delivers strands of shredded product to conveyor 14a where it is transferred to cutter wheel 24a. The cutter wheel 24a in the prior art, however, includes both vertical and transverse cutting edges in the same element. The shredded grain web travels through the cutter wheel and the smooth roll 26a, and then between the cutter wheel 24a and a guide roll 40 whereupon an air shoe, emitting a continuous stream of high pressure air, separates the continuous shredded grain web from the cutter roll onto a pickup conveyor 44. Pickup conveyor 44 transfers the web to conveyor 36a. This normal blow-off system has a number of disadvantages which include damage to product; restrictions on the depth of cut of the product (especially since a deep cut makes the transfer difficult); folding over the product due to product sticking in the wheel; restrictions on the size of piece being handled since smaller pieces are more difficult; some plugging in the wheel which creates down time and lost production; increased noise level due to blowing, the expense associated with making completely new cutter heads for different product, and the amount of air required and the related cost of equipment and energy to supply such air.

Accordingly, the apparatus and system of the present invention improves the process by providing a very smooth travel from the wheel and no damage of the product by excessive blowing of air. Moreover by use of the invention, the product can be cut with no hangup in the cup, no doubling over of product, and smaller sizes can be accommodated with little or no plugging on the wheel. Furthermore, the present cutter wheel can be operated with no noise from an air blower, and at a savings realized by elimination of the air blower and the associated equipment.

Furthermore, since the slitters are separate from the cutter wheel, the width of the biscuit can be easily changed by adjusting the slitters, and a totally different size biscuit can also be obtained by changing the distance between the blades on the cutter wheel without changing the cutter head. Moreover, since the operator can maintain a narrow width of slitter edge and a narrower cutter blade edge by changing the slitter discs and cutter blades, a fluffier, less dense product results. This is an additional factor contributing to cost savings in the product. Specifically, a 10% increase in the puff of the biscuit or piece with a slight less bulk density can be achieved.

Thus, while there have been described what are presently believed to be preferred embodiments of the invention, those skilled in the art will realize that changes and modifications may be made thereto without departing from the spirit of the invention, and it is intended to claim all such changes and modifications as fall within the true scope of the invention.

What is claimed is:

1. In an apparatus for cutting a continuous travelling web of shredded grain product, the apparatus including slitting blade means for slitting the web in a first direction parallel to the direction of travel of the web and means for cutting the web in a second direction transverse to the first direction, the improvement comprising:

stripping means for preventing the web from adhering to the slitting means, including at least one endless belt means disposed adjacent a slitting blade of the slitting means; and wherein the transverse cutting means includes cutting wheel means having cutting teeth means transverse to the web direction of travel, circumferentially spaced on said wheel, the relative motion of said cutting wheel and the web defining downstream and upstream directions with respect to the web, said teeth being defined, in cross-section, by mutually intersecting first, second and third arcs, said first arc extending substantially the entire distance between said adjacent teeth, said second arc having a radius substantially smaller than the radius of said first arc and being located upstream of said first arc, and said third arc having a radius smaller than the radius of said second arc and being located downstream of said first arc, whereby the shredded grain product is formed having crimped edges.

* * * * *